US007069956B1

(12) United States Patent
Mosier

(10) Patent No.: US 7,069,956 B1
(45) Date of Patent: Jul. 4, 2006

(54) MARINA PIPING

(76) Inventor: James W. Mosier, 3261 McCracken, Muskegon, MI (US) 49441

( * ) Notice: Subject to any disclaimer, the term of this patent is extended or adjusted under 35 U.S.C. 154(b) by 0 days.

(21) Appl. No.: 10/968,618

(22) Filed: Oct. 19, 2004

Related U.S. Application Data

(60) Provisional application No. 60/513,439, filed on Oct. 23, 2003.

(51) Int. Cl.
*F16L 11/00* (2006.01)

(52) U.S. Cl. ............... 138/138; 138/114; 138/149; 138/127; 138/124; 138/125

(58) Field of Classification Search ............... 138/138, 138/137, 127, 140, 143, 114, 113, 124, 149, 138/141
See application file for complete search history.

(56) References Cited

U.S. PATENT DOCUMENTS

| | | | | |
|---|---|---|---|---|
| 553,971 A | 2/1896 | Tyler | ........................ | 184/92 |
| 4,025,675 A | 5/1977 | Jonda | ........................ | 428/36 |
| 4,356,222 A * | 10/1982 | Harakawa et al. | ............ | 428/78 |
| 4,679,898 A * | 7/1987 | Grooten | ........................ | 385/107 |
| 4,873,116 A | 10/1989 | Ancker | ........................ | 428/36.9 |
| 4,942,903 A | 7/1990 | Jacobsen | ........................ | 138/110 |
| 5,014,751 A | 5/1991 | Wakabayashi et al. | ...... | 138/127 |
| 5,098,221 A | 3/1992 | Osborne | ........................ | 405/52 |
| 5,182,147 A * | 1/1993 | Davis | ........................ | 428/34.4 |
| 5,183,079 A | 2/1993 | Blin | ........................ | 138/110 |
| 5,279,332 A | 1/1994 | Winter et al. | ............... | 138/111 |
| 5,297,896 A | 3/1994 | Webb | ........................ | 405/52 |
| 5,307,842 A | 5/1994 | Lequeux | ........................ | 138/149 |
| 5,344,697 A * | 9/1994 | Romanowski | ............... | 442/41 |
| 5,345,813 A | 9/1994 | Flessas | ........................ | 73/46 |
| 5,368,670 A | 11/1994 | Kauffman | ................... | 156/171 |
| 5,486,408 A * | 1/1996 | Sentendrey | ................. | 428/220 |
| 5,494,374 A | 2/1996 | Youngs et al. | ................ | 405/52 |
| 5,527,130 A | 6/1996 | Webb | ........................ | 405/52 |
| 5,567,083 A | 10/1996 | Osborne | ....................... | 405/154 |
| 5,590,981 A | 1/1997 | Osborne | ....................... | 405/154 |
| 5,775,842 A | 7/1998 | Osborne | ....................... | 405/154 |
| 5,865,216 A | 2/1999 | Youngs | ...................... | 138/135 |
| 6,116,817 A | 9/2000 | Osborne | ....................... | 405/154 |
| 6,182,705 B1 | 2/2001 | Sumner | ...................... | 138/140 |
| 6,371,154 B1 | 4/2002 | Kesterman et al. | .... | 137/315.01 |
| 6,446,672 B1 | 9/2002 | Kalman et al. | ............. | 138/127 |
| 2002/0117228 A1 | 8/2002 | Nakajima et al. | ........... | 138/153 |

* cited by examiner

*Primary Examiner*—Patrick Brinson
(74) *Attorney, Agent, or Firm*—Young & Basile, P.C.

(57) ABSTRACT

A marina pipe includes a flexible conduit resistant to mechanical stresses, the conduit adapted to surround the secondarily contained flexible piping. The conduit comprises a metallic core and a thermoplastic jacket. The secondarily contained flexible piping comprises an inner supply pipe, wherein the inner pipe is comprised of a first, inner layer fabricated from nylon, a second, intermediate layer comprising a nylon reinforced wrap, and a third, outer layer comprising a polyethylene material, the nylon inner material, the nylon wrap and the polyethylene outer layer being extruded simultaneously to form the inner pipe. The secondarily contained flexible piping further comprises a flexible outer secondary containment pipe within which the inner supply pipe is carried, the outer pipe being fabricated from a fuel impervious material and having a plurality of radially projecting flanges disposed between the inner supply pipe and the outer secondary containment pipe, to provide a locking engagement of the pipes with respect to each other and to provide for a flow passage between the pipes. Adjacent to the outer flanged pipe is a fire resistant silica needle mat layer.

20 Claims, 1 Drawing Sheet

MARINA PIPING

This application claims priority of U.S. Provisional Patent Application Ser. No. 60/513,439 filed on Oct. 23, 2003.

BACKGROUND OF THE INVENTION

The present invention relates to an aboveground marina piping construction.

A secondary containment system is one which functions to collect and contain the fluids leaking out of another (primary) containment system. For example, a primary containment system may store and deliver gasoline at a filling station. A secondary containment system would collect and contain the same gasoline if a primary delivery pipe should rupture or otherwise spill the gasoline. Secondary containment systems have been developed to overcome the environmental problems that have been encountered with respect to leakage of hazardous fluids from tanks and pipe lines. As indicated, this can be a particular problem with respect to marina installations in which undetected leakage of hazardous fluids into the surrounding water over long periods of time can produce harmful conditions for both sea life and human beings, as well as extensive pollution which is difficult and expensive to clean.

In addition, since these systems are not applicable for use above-ground, conduits have been provided to house the primary and secondary containment systems. These particular conduits have special considerations which include, but are not limited to: piping flexible enough to bend around existing structures and/or sea terrain; both the primary and secondary piping should be removable for repairs and/or replacement; the primary and secondary piping should be protected from external damage, and from degradation from ultraviolet rays; the piping system should be waterproof; and the piping should be strong enough to be protected from external loads such as boat props and the like.

Manufacturers of containment systems have responded by developing and producing a variety of secondary containment and housing systems for conventional above-ground piping which are designed to contain and prevent any leakage from escaping into the environment. However, proposed regulation is now requiring that piping used in a marina environment must be capable of sustaining a certain fire rating. The fire rating requires a pipe carrying hydrocarbons in a marine environment to be fire resistant at a temperature of 1100° for twelve minutes.

SUMMARY OF THE INVENTION

It is the intent of the present invention to address the aforementioned issues. According to the present invention, marina piping is provided comprised of a primary pipe supplying a fluid between a first location and a second location, a secondary pipe for carrying the primary pipe, and a flexible conduit resistant to mechanical stresses for housing the primary and secondary pipes. The flexible conduit includes a galvanized steel metallic core and one of a low density polyethylene and a medium density polyethylene jacket. The secondary pipe is provided with a high temperature and fire resistant layer for meeting proposed UL® standards.

Other applications of the present invention will become apparent to those skilled in the art when the following description of the best mode contemplated for practicing the invention is read in conjunction with the accompanying drawings.

BRIEF DESCRIPTION OF THE DRAWINGS

Other objects, features and advantages of the present invention will become apparent by reference to the following detailed description and drawings, in which.

DETAILED DESCRIPTION OF THE PREFERRED EMBODIMENTS

Figure 1:
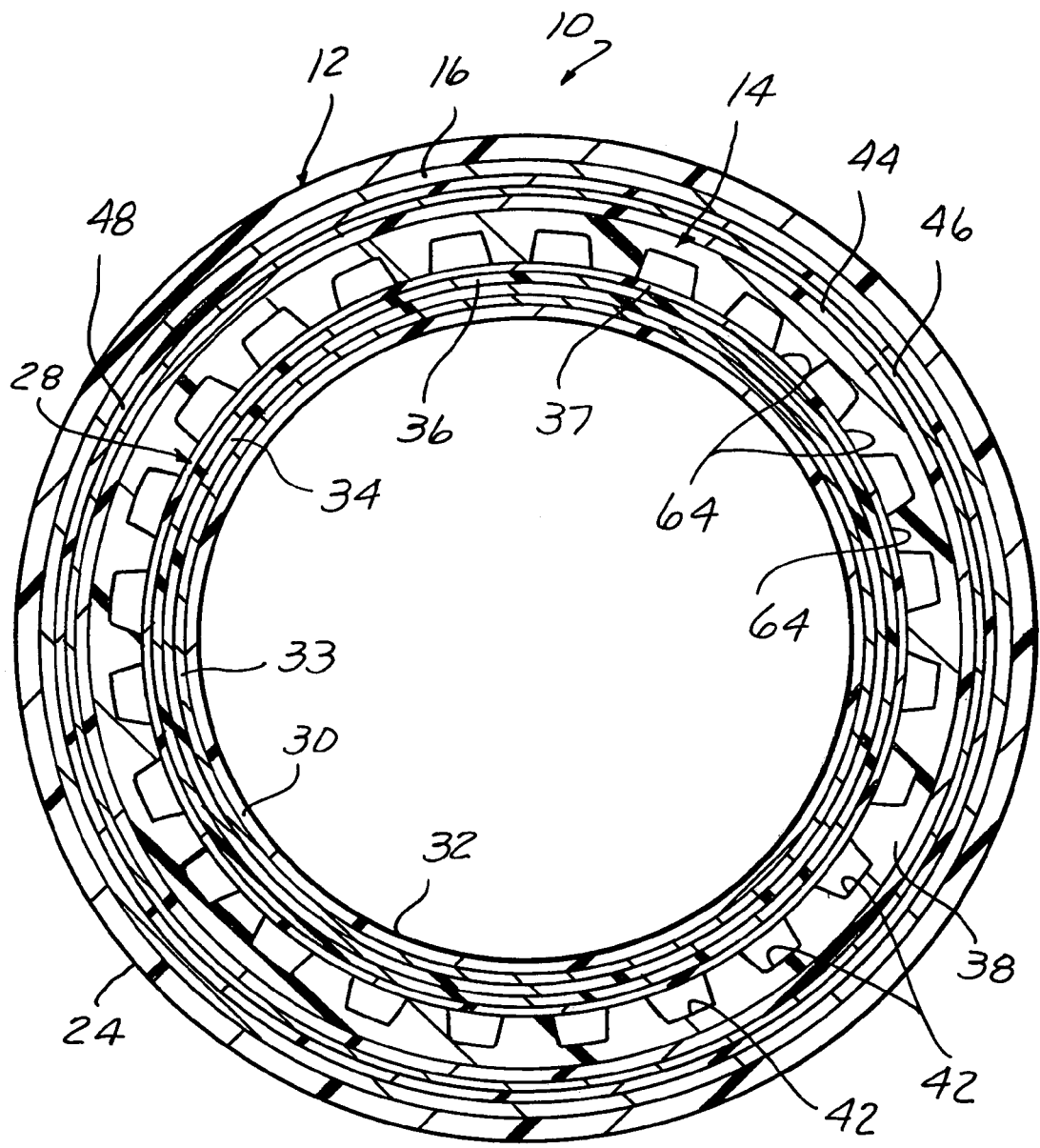
FIG. 1 is a cross-sectional view of the marina pipe according to the present invention.
Figure 2:
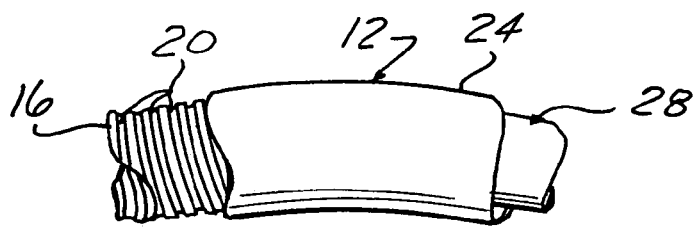
FIG. 2 is an enlarged, partially cut away, partially cross sectioned view of the metallic conduit used in the housing system of the present invention, showing a non-secondarily contained primary pipe extending therefrom.

Referring now to FIG. 1, a system for housing secondarily contained, or primary, non-secondarily contained flexible piping is designated generally as 10. As best seen in FIG. 2, housing system 10 comprises a flexible conduit 12 resistant to mechanical stresses. Conduit 12 is adapted to surround primary piping 28, as shown, as well as secondarily contained flexible piping 14 as shown in FIGS. 1 and 2.

Conduit 12 comprises a metallic core 16. It is to be understood that this core 16 may be formed by any suitable method and from any suitable material (including, for particular applications, a suitably strong, flexibly rigid, non-metallic material). However, in the preferred embodiment, this core 16 is formed from a continuously wound, galvanized steel liquid tight electrical core strip. The core 16 may be formed in an interlocking, "double strip wound" pattern, forming grooves on the inner surface and on the outer surface of the core 16. Core 16 may further comprise a seamless, corrugated metal as shown in FIG. 2, with similar grooves 20.

The housing system 10 further comprises a thermoplastic jacket 24. It is to be understood that jacket 24 may be formed from any suitable material and by any suitable method. However, in the preferred embodiment, jacket 24 is formed from polyvinyl chloride (PVC). It may also be formed from polyethylene, rubber and/or a thermoset polymeric material. The PVC is extruded over the metallic core 16, fitting into grooves 20. This forms ribs (not shown) on the inner surface of jacket 24 which abuts core 16; and a substantially smooth outer surface of jacket 24. The ribs aid in preventing creepage of core 16 over time. Whatever material is chosen for jacket 24, it should be substantially impervious to water and hydrocarbons. In addition to being impervious to these materials, PVC as used in this application is also resistant to thermal influences, sunlight (ultraviolet radiation) and various chemicals; thereby making the housing system 10 also resistant to these substances. The housing system 10 of the present invention is also able to withstand high compressive stress and tensile strain to withstand external loads such as boat props and the like.

One example of a suitable core 16 with jacket 24 is commercially available from Anamet Electrical, Inc. in Mattoon, Ill. under the trademark ANACONDA SEAL-TITE® Type UA/EF. Any suitable diameter may be used for a particular application, and are available in many electrical trade sizes. One illustrative example of a suitable core 16 with jacket 24 has an inside diameter of 2.505 inch; and an outside diameter of 2.875 inch.

The secondarily contained flexible piping 14 comprises an inner supply pipe 28. Inner supply pipe 28 preferably has a fuel impervious material by any suitable method. In the preferred embodiment, inner pipe 28 is comprised of a first, inner layer 30 fabricated from nylon and having a smooth, fluid-contacting interior portion 32. A suitable material for layer 30 is a nylon 12 material having a thickness preferably of 0.080±0.005 inch. Layer 30 is wrapped with a sheet of a metallized polyester 33 which forms a fuel impervious barrier to limit evaporative vapors therefrom. Inner pipe 28 further comprises another intermediate layer 34 comprising a nylon reinforced wrap, such as a nylon 6 yarn reinforcement braid wrap preferably having 9–12 intersections per inch; and a third, outer layer 36 comprising a medium density hexane copolymer material having high stress cracking resistance. One such hexane copolymer is commercially available from Chevron Chemical Company under the trade name MARLEX The nylon inner material 30, the nylon wrap 34 and the medium density hexane copolymer outer layer 36 are extruded simultaneously to form the inner pipe 28. The outer layer 36 is also wrapped with a clear polyester film 37.

It is to be understood that any suitable diameters and thicknesses may be used for any components of the system 10, as desired and/or as required for a particular installation. In the preferred embodiment, the inner layer 30 is about 0.080 inch thick and the outer layer 36 is about 0.060 inch thick. Preferably, pipe 28 has an inside diameter of about 1.68 inch and an outside diameter of about 2.00±0.020 inch. A maximum operating pressure of 150 psi and a minimum burst pressure of 750 psi. The material is flexible and has a bend radius of 12 inch to 24 inch.

The secondarily contained flexible piping 14 further comprises a flexible outer secondary containment pipe 38 within which the inner supply pipe 28 is carried, the outer pipe 38 being fabricated from a fuel impervious material. The secondary containment pipe 38 has a plurality of radially inwardly projecting flanges 64. A plurality of radially projecting flanges 64 are disposed between the inner supply pipe 28 and the outer secondary containment pipe 38 to provide for a flow passage 42 between the pipes 28, 38.

It is to be understood that outer secondary containment pipe 38 may be formed from any suitable material and in any suitable manner; however, in the preferred embodiment, the flexible outer secondary containment pipe 38 is fabricated from an extruded material that is both chemically compatible with and impervious to the fluids to be transmitted therethrough. Some suitable examples of preferred materials include a low or medium density polyethylene, clear polyurethane, and clear acrylonitrile. Outer pipe 38 may be extruded separately from inner pipe 28, or may be coextruded therewith. The outer pipe 38 is sized to permit the inner pipe 28 to be inserted therein with little or no resistance and may be, preferably, assembled in the combined arrangement at the factory, and may additionally be assembled within conduit 12 at the factory, ready for positioning in the particular above-ground installation when delivered onsite. In the illustrated embodiment, the outer pipe 38 has a nominal outer diameter of 2.350±0.020 inches. The outer pipe 38 is very flexible and can bend as needed to accommodate the bending of the primary inner pipe 28.

While it is preferred that the primary pipe 28, secondary containment pipe 38 and conduit 12 be assembled at a factory location, there may be situations in which the pipes are assembled on site before installation. The pipe 28 may be removed and any of the pipes may be replaced if a leak or any other defect is found during testing.

On the external surface of pipe 38 is a thick insulating layer 44 having the property of being fire resistance tested in a temperature of 1100° F. for 12 minutes to meet proposed UL standards. One such material having this characteristic is a silica needle mat (SNM) available through Pyro Shield Inc. The thickness of the insulating layer, silica needle mat 44 is preferable 0.125 inch.

Adjacent the silica needle mat is a wrap 46 fabricated from a metallized polyester film 41 having one side adhesive for laminating film 46 to silica needle mat 44. Another layer 48 comprises a low or medium density polyethylene material. In the illustrated embodiment, the layer 48 has a nominal outer diameter of 2.64±0.030 inches.

The aforementioned polyester films may be one available through E.I. du Pont de Nemours Company under the trade name MYLAR. The addition of successive wraps is a safeguard in the event that the alcohol, hydrocarbon, or other environmentally unsafe fluid escapes through the seam of the first wrap. If this did occur, such fluid would have to travel a full 180° in order to escape from the seam of a second wrap; if such occurred, the fluid would have to turn around and travel a full 180° to escape from a third wrap, and so on. It can be seen that, since there is little likelihood that such fluid would escape from the first seam, the chance of the fluid traveling in such a manner through a second, third, fourth, etc. wrap to eventually escape is substantially non-existent. As such, a point of diminishing returns may be reached, and the manufacturer and/or user, may see no necessity in providing more than perhaps one or two barrier film wraps.

With any of the single or multiple wrap layers shown, the polyester film may be a metallized polyester film, as stated above. Further, this metallized polyester film more specifically and preferably may be aluminized.

The present marina pipe 10 offers many advantages including, but not limited to the following. As can be seen in FIG. 1, the marina pipe 10 is flexible enough to bend around existing structures and/or sea terrain. Discrete sections of the primary 28 and secondary 38 piping may be removable for ease in installation. Once the system is installed, the pipes 28, 38 are generally not removable. The conduit 12, with or without thermoplastic jacket 24, protects the secondary containment piping 14 from external damage, and from degradation from ultraviolet rays. The system 10 is waterproof, and it also provides sufficient protection to the piping 14 from external loads such as boat props and the like. The system is also fireproof to withstand temperatures of 1100° for up to twelve minutes.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A marina piping comprising:
    a primary pipe for supplying a fluid between a first location and a second location;
    a secondary pipe for carrying the primary pipe;
    a flexible conduit resistant to mechanical stresses, the conduit adapted to surround the primary and secondary pipes, the flexible conduit including a galvanized steel metallic core;
    a high temperature and fire resistant insulating layer surrounding the secondary pipe; and
    one of a low density polyethylene and a medium density polyethylene jacket surrounding the insulating layer, wherein the insulating layer is disposed between the secondary pipe and the polyethylene jacket, and the polyethylene jacket is disposed between the insulating layer and the metallic core.

2. The marina piping of claim 1, wherein the insulating layer is a silica needle mat having a laminated backing.

3. The marina piping of claim 2, wherein the silica needle mat layer is essentially 0.125 inches thick.

4. The marina piping of claim 1, wherein the primary pipe includes:
   a first, inner layer made of a nylon material;
   a second, intermediate layer comprising a nylon reinforced wrap; and
   a third, outer layer comprising a medium density hexane copolymer,
   wherein the nylon inner layer, the nylon wrap, and the medium density hexane copolymer outer layer are extruded simultaneously to form the primary piping.

5. A marina piping comprising:
   a primary pipe chemically compatible and impervious to fluids to be transmitted therethrough;
   a flexible secondary pipe within which the primary pipe is carried;
   a flexible conduit resistant to mechanical stresses, the conduit adapted to surround the flexible secondary pipe, the flexible conduit comprising a metallic core and thermoplastic jacket surrounding the metallic core;
   an insulating layer comprising a silica needle mat material surrounding the secondary pipe; and
   a metallized polyester film surrounding the silica needle mat, wherein the metallized polyester film is disposed between the silica needle mat and the metallic core of the flexible conduit.

6. The marina piping of claim 5, wherein the thickness of the silica needle mat layer is essentially 0.125 inch.

7. The marina piping of claim 5, wherein the silica needle mat layer is sandwiched between the secondary pipe and a metallized polyester film.

8. The marina piping of claim 7, further comprising a layer of low or medium density polyethylene over the metallized polyester film.

9. The marina piping of claim 7, wherein the metallized polyester film is aluminized.

10. The marina piping of claim 5, wherein the primary pipe includes a layer of a medium density hexane copolymer material.

11. The marina piping of claim 5, wherein the layer of silica needle mat material has a laminated backing for facilitating application to the pipe.

12. The marina piping of claim 2, wherein the laminated backing is a metallized polyester film.

13. The marina piping of claim 1, wherein the primary pipe comprises:
   an inner layer made of a nylon material, the nylon inner layer having an inner surface in contact with the fluid flowing between the first and second locations; and
   a first intermediate layer surrounding the nylon inner layer, the first intermediate layer consisting of a sheet of metallized polyester.

14. The marina piping of claim 13, wherein the primary pipe further comprises:
   a second intermediate layer surrounding the first intermediate layer, the second intermediate layer consisting of a nylon reinforced wrap;
   a third intermediate layer consisting of a medium density hexane copolymer surrounding the second intermediate layer; and
   a polyester sheet surrounding the third intermediate layer.

15. A mulit-layered piping system for transporting a fluid from one location to another, the pipe comprising:
   a primary pipe having a interior surface in contact with the fluid;
   a secondary pipe surrounding an outer surface of the primary pipe, the secondary pipe having a plurality of flanges projecting radially inward, the flanges and the outer surface of the primary pipe defining a plurality of passages for transporting the fluid axially along a length of the piping system in the event a leak occurs in the primary pipe;
   a fire resistant insulating layer comprising a silica needle mat surrounding the secondary pipe; and
   a first sheet of metallized polyester surrounding the insulating layer.

16. The piping system of claim 15, wherein the primary pipe comprises:
   a nylon inner layer that defines the inner surface of the primary pipe that contacts the fluid flowing through the primary pipe;
   a second sheet of metallized polyester surrounding an exterior surface of the nylon inner layer;
   a woven nylon reinforce blanket surrounding and the metallized polyester sheet, such that an;
   a layer of medium density hexane copolymer material overlaying the nylon reinforce blanket;
   and a polyethylene sheet surrounding the medium density hexane copolymer.

17. The piping system of claim 16, wherein at least one of the first and second metallized polyester sheets is aluminized.

18. The piping system of claim 15, wherein the first sheet of metallized polyester is bonded to the insulating layer.

19. The piping system of claim 15, wherein the primary pipe is slideably engages the secondary pipe.

20. The piping system of claim 15 further comprising a flexible conduit surrounding the primary and secondary pipes, the plastic jacket comprising a metallic core and a plastic jacket encasing an exterior of the metallic core, wherein the secondary pipe slideably engages the flexible conduit.

* * * * *